(12) United States Patent
Sakamoto et al.

(10) Patent No.: US 12,456,947 B2
(45) Date of Patent: Oct. 28, 2025

(54) LIGHT COLLECTING DEVICE

(71) Applicant: TOYOTA JIDOSHA KABUSHIKI KAISHA, Toyota (JP)

(72) Inventors: Hideo Sakamoto, Toyota (JP); Yoshinobu Nozaki, Anjyo (JP); Hiroyuki Ogura, Ama (JP); Hisashi Fujisawa, Toyota (JP); Mitsuaki Tomita, Toyota (JP); Yasunobu Seki, Nissin (JP); Shoichi Iwamoto, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 18/544,819

(22) Filed: Dec. 19, 2023

(65) Prior Publication Data
US 2024/0258965 A1     Aug. 1, 2024

(30) Foreign Application Priority Data
Jan. 30, 2023  (JP) .................................. 2023-012046

(51) Int. Cl.
*H02S 40/22*     (2014.01)
*F24S 23/70*     (2018.01)
*H02S 20/30*     (2014.01)

(52) U.S. Cl.
CPC .............. *H02S 40/22* (2014.12); *F24S 23/82* (2018.05); *H02S 20/30* (2014.12)

(58) Field of Classification Search
CPC .......... H02S 40/22; H02S 20/30; H02S 20/32; F24S 23/82; Y02E 10/52
See application file for complete search history.

(56) References Cited

U.S. PATENT DOCUMENTS

2012/0067339 A1 *  3/2012  Hall ....................... A01G 9/243
                                                      126/714

FOREIGN PATENT DOCUMENTS

JP            2020190153 A   * 11/2020

\* cited by examiner

*Primary Examiner* — Michael Y Sun
(74) *Attorney, Agent, or Firm* — SoraIP, Inc.

(57) ABSTRACT

Equipped with a solar power generation device that includes a light collecting member that collects and irradiates sunlight, a drive device that drives the light collecting member, and a control device that controls the drive device, and that has at least one solar cell panel. A light collecting device that irradiates light to a parked vehicle using a light concentrating member, the control device determining the power generation efficiency of solar power generation by the solar power generation device based on the position of the solar cell panel. The drive device is controlled so that the power generation efficiency is equal to or higher than the initial power generation efficiency that is the power generation efficiency at the initial position of the light collecting member.

2 Claims, 2 Drawing Sheets

LIGHT COLLECTING DEVICE

CROSS-REFERENCE TO RELATED APPLICATION

This application claims priority to Japanese Patent Application No. 2023-012046 filed on Jan. 30, 2023, incorporated herein by reference in its entirety.

BACKGROUND

1. Technical Field

The present disclosure relates to a light collecting device.

2. Description of Related Art

Conventionally, as this type of light collecting device, a device that is fixed to a roof of a garage, and that is equipped with a light collecting member (light collecting sheet) that collects sunlight and performs irradiation of the sunlight, has been proposed (for example, see Japanese Unexamined Patent Application Publication No. 2020-190153 (JP 2020-190153 A)). In this device, sunlight is collected by the light collecting member and irradiated to a vehicle parked in the garage and equipped with a solar power generation device having a solar cell.

SUMMARY

However, with the above-described light collecting device, depending on a mounting position of the solar cell on the vehicle or a parking position of the vehicle, sunlight may not be able to be efficiently irradiated to the solar cell, and power generation efficiency of solar power generation by the solar power generation device may decrease.

A main object of a light collecting device of the present disclosure is to suppress a decrease in power generation efficiency of solar power generation in a parked vehicle equipped with a solar power generation device.

The light collecting device of the present disclosure employs the following means to achieve the above-described main object.

A light collecting device according to an aspect of the present disclosure includes:
  a light collecting member that collects sunlight and performs irradiation of the sunlight;
  a drive device that drives the light collecting member; and
  a control device that controls the drive device.

The light collecting device irradiates a parked vehicle equipped with a solar power generation device provided with at least one solar cell panel with light using the light collecting member.

The control device controls the drive device such that power generation efficiency of solar power generation by the solar power generation device is equal to or higher than initial power generation efficiency that is the power generation efficiency at an initial position of the light collecting member, based on a position of the solar cell panel.

In the light collecting device of the above aspect, the drive device is controlled such that the power generation efficiency of the solar power generation using a solar cell is equal to or higher than the initial power generation efficiency that is the power generation efficiency at the initial position of the light collecting member, based on the position of the solar cell panel. As a result, it is possible to suppress the decrease in the power generation efficiency of the solar power generation in a parked vehicle equipped with the solar cell.

In the light collecting device of the above aspect, the control device may control the drive device such that the power generation efficiency is equal to or higher than the initial power generation efficiency, based on the position of the solar cell panel, and an altitude and an orientation of the sun. Thus, the light collecting member can be driven more appropriately and the solar cell can be irradiated with light. As a result, it is possible to suppress the decrease in the power generation efficiency of the solar power generation.

Further, in the light collecting device of the above aspect: the drive device may be able to change an inclination angle of the light collecting member with respect to ground; and the control device may set a target inclination angle of the light collecting member with respect to a horizontal plane to cause the power generation efficiency to be equal to or higher than the initial power generation efficiency, based on the position of the solar cell panel, and may control the drive device such that an inclination angle of the light collecting member with respect to the horizontal plane becomes the target inclination angle. Thus, the solar cell can be irradiated with light by changing the inclination angle of the light collecting member with respect to the horizontal plane. As a result, it is possible to suppress the decrease in the power generation efficiency of the solar power generation.

Furthermore, the light collecting device of the above aspect may further include
  a panel position detection device that detects the position of the solar cell panel. Thus, the position of the solar cell can be properly grasped. As a result, it is possible to suppress the decrease in the power generation efficiency of the solar power generation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described using examples.

Figure 1:
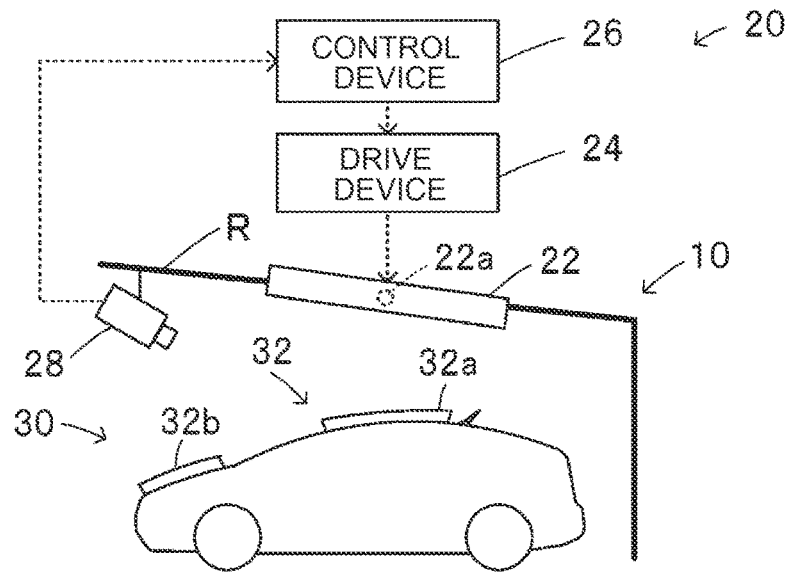
FIG. 1 is a configuration diagram schematically showing the configuration of a light collecting device 20 as an example of the present disclosure.

FIG. 1 is a configuration diagram schematically showing the configuration of a light collecting device 20 as an example of the present disclosure. The light collecting device 20 includes a light collecting plate (light collecting member) 22, a drive device 24, and a control device 26.

The light collecting plate 22 is formed as a reflecting mirror that reflects sunlight, and is attached to the roof R of the garage 10 that is formed as a cantilever structure consisting of a roof R that is inclined with respect to a horizontal plane and a support column Pi that supports the roof R. The light collecting plate 22 is configured to be rotatable around a rotation axis 22a extending in the width direction of the vehicle 30 (direction perpendicular to the paper surface in FIG. 1) when the vehicle 30 is parked in the garage 10. The vehicle 30 is equipped with a solar power generation device 32 that includes solar cell panels 32a and 32b mounted on the roof of the vehicle body and the front hood, and a converter (not shown) that supplies power generated by the solar cell panels 32a and 32b to a battery.

Although not shown, the drive device 24 includes an electric motor, a link mechanism, etc., and drives the light collecting plate 22 by rotating the light collecting plate 22 in synchronization around the rotation axis 22a. The inclination angle θp of the light collecting plate 22 with respect to the horizontal plane is changed.

The control device 26 is configured as a microprocessor centered on a CPU (not shown). Image data from a camera (panel position detection device) 28 attached to the roof R of the garage 10 and photographing the inside of the garage 10 is input to the control device 26. A control signal to the drive device 24 is input from the control device 26.

Figure 2:
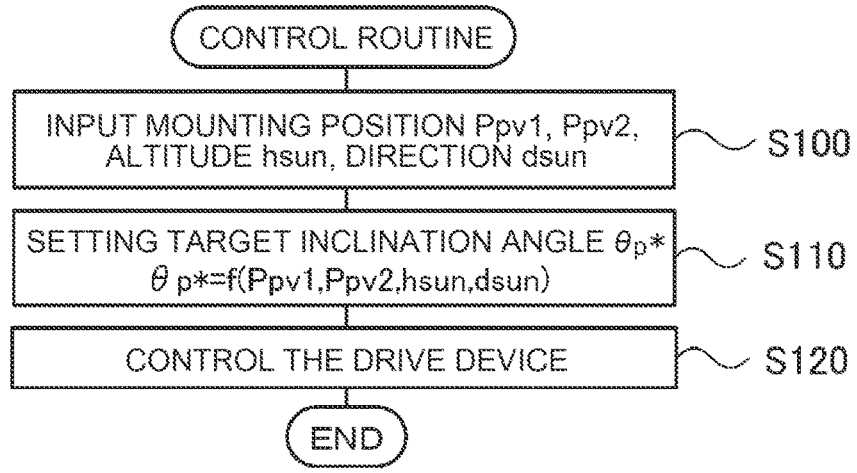
FIG. 2 is a flowchart showing an example of a control routine executed by the CPU of the control device.

Next, the operation of the light collecting device 20 configured in this way will be explained. FIG. 2 is a flowchart showing an example of a control routine executed by the CPU of the control device. This routine is repeatedly executed at predetermined intervals (e.g., 30 minutes, 1 hour, 1.5 hours, etc.) while the vehicle 30 is parked in the garage 10. In determining whether or not the vehicle 30 is parked in the garage 10, when the presence of the vehicle 30 is detected in the garage 10 by image recognition based on image data from the camera 28, it is determined whether the vehicle 30 is parked in the garage 10. It is determined that the vehicle is parked.

Figure 3:
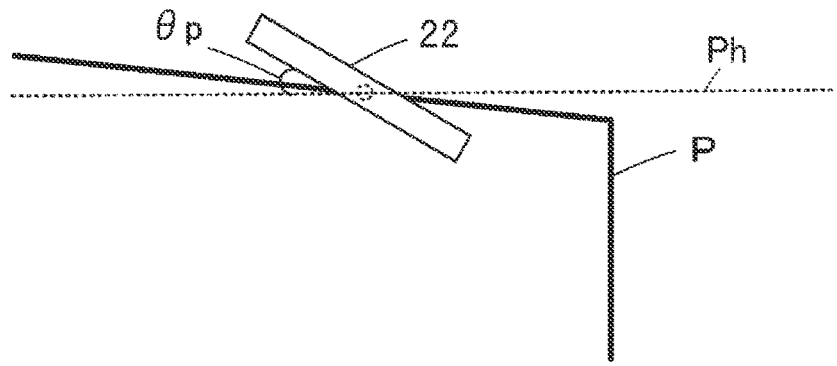
FIG. 3 is an explanatory diagram for explaining an example of the relationship between the horizontal plane and the inclination angle.

When this routine is executed, the positions Ppv1 and Ppv2 of the solar cell panels 32a and 32b of the vehicle 30 parked in the garage 10, the altitude (elevation angle) hsun and direction dsun of the sun at the current date and time, and the light collecting plate 22 are determined. A process of inputting the inclination angle θp with respect to the horizontal plane Ph is executed (S100). FIG. 3 is an explanatory diagram for explaining an example of the relationship between the horizontal plane Ph and the inclination angle θp. The positions Ppv1 and Ppv2 are extracted by performing image recognition on image data from the camera 28. The solar altitude hsun and the azimuth dsun are set by storing the relationship between the date and time, the solar altitude hsun, and the azimuth dsun in advance as a database, and deriving the altitude hsun and the azimuth dsun from the database. The inclination angle θp is calculated based on the amount of rotation of the rotation axis 22a from the reference position. Examples of the reference position include a position where the light collecting plate 22 is substantially parallel to the roof R of the garage 10 (the position shown in FIG. 1).

Next, using the input positions Ppv1, Ppv2, altitude hsun, and direction dsun, a target inclination angle θp* is set as a target value of the inclination angle of the light collecting plate 22 with respect to the horizontal plane Ph (S110). The target inclination angle θp* is set by the following method. The control device 26 stores in advance the altitude and direction of the sun, the positions of the solar cell panels 32a and 32b in the garage 10, the inclination angle of the light collecting plate 22, and the sunlight generated by the solar power generation device 32 in a ROM (not shown). The relationship between power generation efficiency and power generation efficiency is stored as a database. The control device 26 derives the initial power generation efficiency Egi as the power generation efficiency corresponding to the positions Ppv1 and Ppv2, the altitude hsun, the direction dsun, and the inclination angle θp input in S100 from the stored database. Then, from the database, it is determined whether there is an inclination angle at which the power generation efficiency is higher than the derived initial power generation efficiency Egi at the same positions Ppv1, Ppv2, altitude hsun, and direction dsun, and power is generated from the derived initial power generation efficiency Egi. If there is an inclination angle that increases the efficiency, set that inclination angle as the target inclination angle θp*, and if there is no inclination angle that makes the power generation efficiency higher than the derived initial power generation efficiency Egi, the inclination angle θp input in S100 is set as the target inclination angle. Set to θp*. Through such processing, the target inclination angle θp* is set to an inclination angle that makes the power generation efficiency Eg greater than or equal to the initial power generation efficiency Egi.

Figure 4:
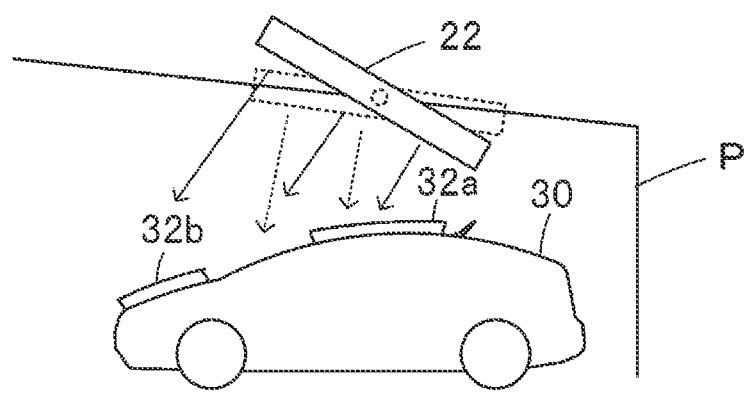
FIG. 4 shows an example of a change in how sunlight hits the solar cell panel when the inclination angle of the light collecting plate is changed.

After setting the target inclination angle θp* in this way, the drive device 24 is controlled so that the inclination angle θp of the light collecting plate 22 becomes the target inclination angle θp* (S120), and this routine ends. FIG. 4 shows an example of how sunlight irradiates the solar cell panels 32a and 32b after changing the inclination angle Op of the light collecting plate 22. In the figure, arrows indicate the traveling direction of sunlight reflected by the light collecting plate 22. The broken line indicates the light collecting plate 22 before changing the inclination angle Op and the traveling direction of sunlight reflected by the light collecting plate 22.

Before changing the inclination angle θp, the sunlight reflected by the light collecting plate 22 is irradiated onto the solar cell panel 32a installed on the roof of the vehicle 30, and is not irradiated onto the solar cell panel 32b installed on the front hood. After changing the inclination angle θp, sunlight reflected by the light collecting plate 22 is irradiated onto both solar cell panels 32a and 32b. By changing the inclination angle θp of the light collecting plate 22 in this way, more sunlight can be irradiated onto the solar cell panels 32a and 32b regardless of the parking position of the vehicle 30, and the solar power generation in the vehicle 30 is improved. A decrease in the power generation efficiency Eg of the solar power generation device 32 can be suppressed.

According to the light collecting device 20 of the embodiment described above, the solar power generation device 32 generates solar power based on the positions Ppv1 and Ppv2 of the solar cell panels 32a and 32b, and the altitude hsun and direction dsun of the sun. By controlling the drive device 24 so that the power generation efficiency Eg is equal to or greater than the initial power generation efficiency Egi, which is the power generation efficiency at the initial position of the light collecting plate 22, in the parked vehicle 30 equipped with the solar power generation device 32, decrease in power generation efficiency Eg of solar power generation can be suppressed.

In the light collecting device 20 of the embodiment, the initial power generation efficiency Egi is the power generation efficiency corresponding to the positions Ppv1 and Ppv2, the altitude (elevation angle) hsun, the azimuth dsun, and the inclination angle θp input in S100. However, the initial power generation efficiency Egi may be the power generation efficiency when the light collecting plate 22 is placed parallel to the roof R of the garage 10 (when the light collecting plate 22 is located at the position in FIG. 1).

In the light collecting device 20 of the embodiment, the positions Ppv1 and Ppv2 of the solar cell panels 32a and 32b are extracted by performing image recognition on image data from the camera 28. However, since it is only necessary to detect the mounting positions of the solar cell panels 32a and 32b, another method is used, for example, by storing the mounting positions of the solar cell panels 32a and 32b in the vehicle 30 in a ROM and using a laser etc. The distance D from the 10 s Pi to the vehicle 30 is detected, and based on the mounting position and distance D of the solar cell panels 32a and 32b on the vehicle 30 stored in the ROM, the distance D between the solar cell panels 32a and 32b in the garage 10 is determined. It is also possible to detect the position of.

In the light collecting device 20 of the embodiment, the drive device 24 changes the inclination angle θp of the light collecting plate 22 with respect to the horizontal plane by rotating the light collecting plate 22 synchronously around the rotation axis 22a. However, on the roof R of the garage 10, two rails are laid parallel to each other in the longitudinal direction of the vehicle 30 inside the garage 10, and the light collecting plate 22 is slidably installed on the rails, and a chain is attached to the drive device. 24 may change the position of the light collecting plate 22 by driving this chain and moving the light collecting plate 22 on the rail. The drive device 24 may be controlled so that the power generation efficiency Eg of solar power generation by the solar power generation device 32 is equal to or higher than the initial power generation efficiency which is the power generation efficiency before the movement of the light collecting plate 22 (initial position).

The light collecting device 20 of the embodiment includes a light collecting plate 22 formed as a reflecting mirror that reflects sunlight. However, instead of such a light collecting plate 22, a condensing lens may be used that condenses and converges sunlight for irradiation.

In the embodiment, a case is illustrated in which the light collecting device 20 of the present disclosure is applied to a vehicle 30 that has two solar cell panels 32a and 32b mounted on the roof and the bonnet. However, the number and position of solar cells mounted on a vehicle to be irradiated with sunlight may be changed as appropriate.

The correspondence between the main elements of the embodiments and the main elements of the disclosure described in the column of means for solving the problems will be explained. In the embodiment, the light collecting plate 22 functions as a "light collecting member", the drive device 24 functions as a "drive device", and the control device 26 functions as a "control device".

Furthermore, the correspondence between the main elements of the examples and the main elements of the disclosure described in the column of means to solve the problem is that the example implements the disclosure described in the column of means to solve the problem. Since this is an example for specifically explaining a form for solving the problem, it is not intended to limit the elements of the disclosure described in the column of means for solving the problem. In other words, the interpretation of the disclosure described in the column of means to solve the problem should be made based on the description in that column, and the examples should be based on the disclosure described in the column of means to solve the problem. This is just one specific example.

Although the embodiments of the present disclosure have been described above, the present disclosure is not limited to these embodiments in any way, and may be modified in various forms without departing from the gist of the present disclosure. Of course, it can be implemented.

The present disclosure can be used in the light collecting device manufacturing industry and the like.

What is claimed is:

1. A light collecting device comprising:
a light collecting member that collects sunlight and performs irradiation of the sunlight;
a drive device that drives the light collecting member; and
a control device that controls the drive device, wherein:
the light collecting device irradiates a parked vehicle equipped with a solar power generation device provided with at least one solar cell panel with light using the light collecting member;
the drive device is able to change an inclination angle of the light collecting member with respect to a horizontal plane;
the control device sets a target inclination angle of the light collecting member with respect to the horizontal plane to adjust a power generation efficiency of solar power generation by the solar power generation device to be equal to or higher than initial power generation efficiency that is the power generation efficiency at an initial position of the light collecting member, based on a position of the solar cell panel and an altitude and an orientation of the sun; and
the control device controls the drive device such that the inclination angle of the light collecting member with respect to the horizontal plane becomes the target inclination angle.

2. The light collecting device according to claim 1, further comprising a panel position detection device that detects the position of the solar cell panel.

* * * * *